Jan. 22, 1952     J. BURLEIGH ET AL     2,583,467
COMBINED SCREEN AND CABINET FOR
PICTURE PROJECTION APPARATUS
Filed Aug. 18, 1948     3 Sheets-Sheet 2
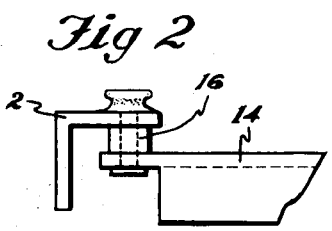
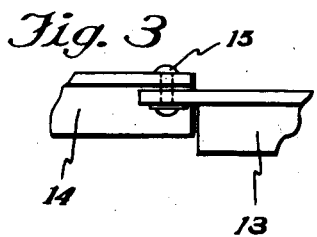
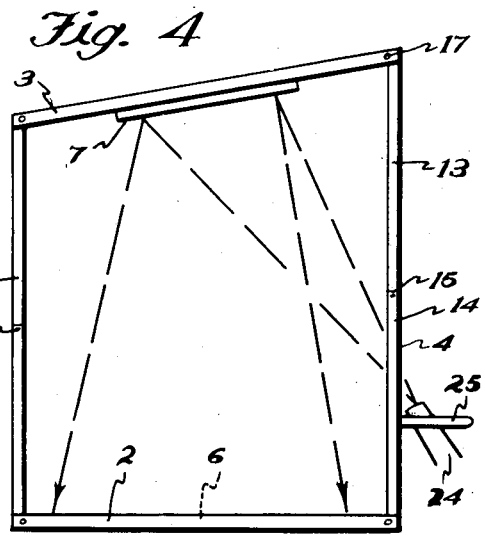
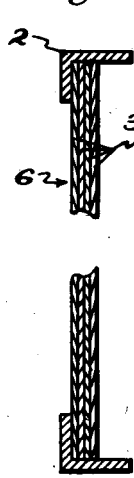
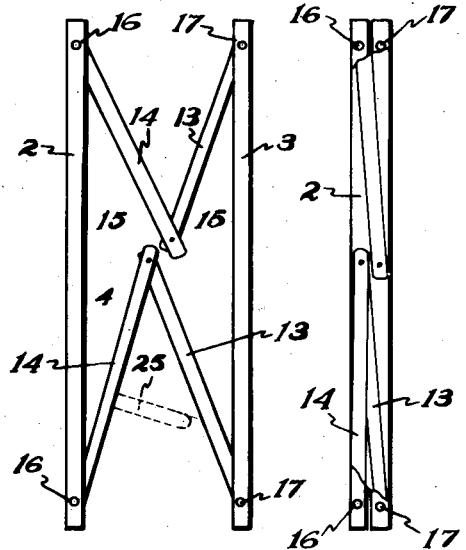
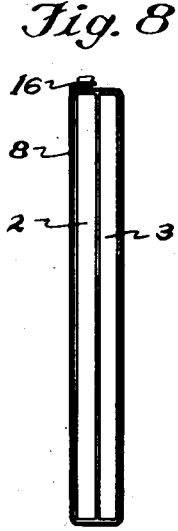
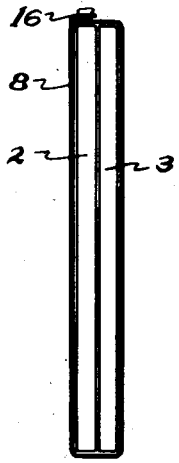
INVENTORS
JOSEPH BURLEIGH
JOSEPH CASHMAN
BY
ATTORNEYS Jan. 22, 1952  J. BURLEIGH ET AL  2,583,467
COMBINED SCREEN AND CABINET FOR
PICTURE PROJECTION APPARATUS
Filed Aug. 18, 1948  3 Sheets-Sheet 3
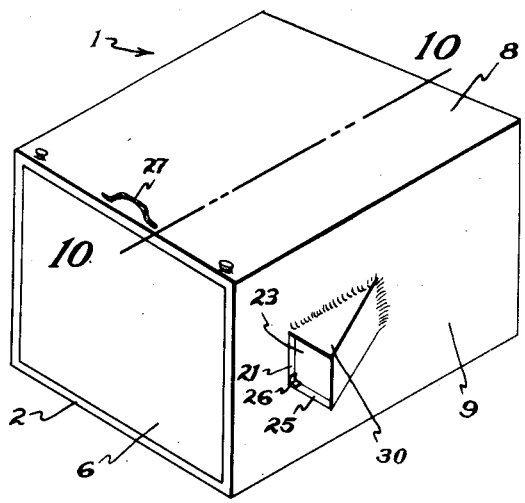
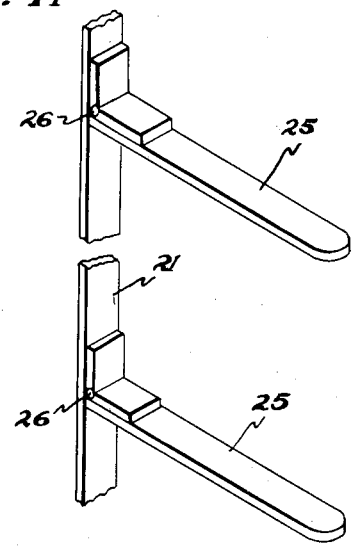
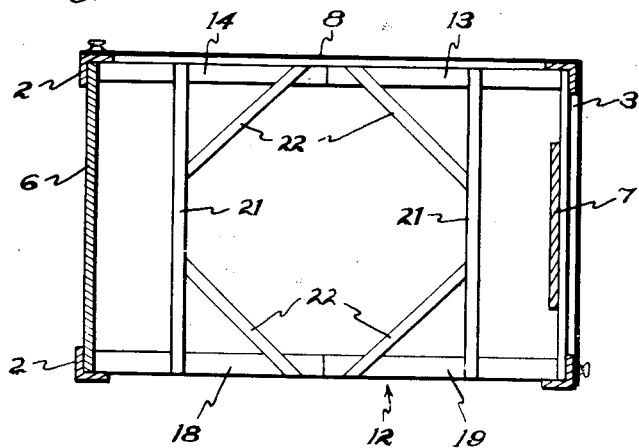
INVENTORS
JOSEPH BURLEIGH
JOSEPH CASHMAN
BY
ATTORNEYS Patented Jan. 22, 1952

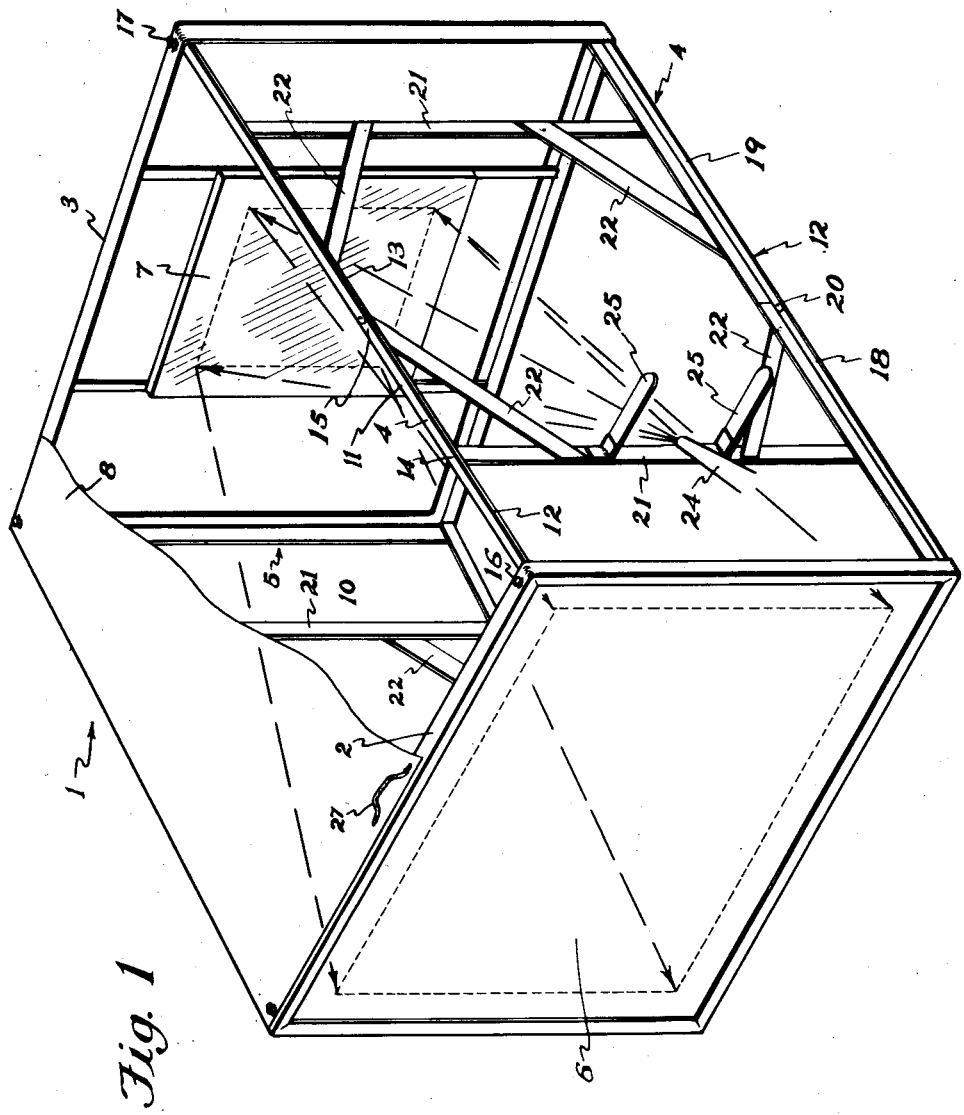

2,583,467

UNITED STATES PATENT OFFICE 2,583,467

COMBINED SCREEN AND CABINET FOR PICTURE PROJECTION APPARATUS

Joseph Burleigh and Joseph Cashman, Franklin, N. H.

Application August 18, 1948, Serial No. 44,868

1 Claim. (Cl. 88—24)

This invention relates to a combined screen and cabinet for picture projecting apparatus and has for one of its objects to provide a novel cabinet having the screen mounted in one side thereof and provided at the opposite side with a mirror by which the image projected from a projection apparatus may be reflected onto the back of the screen.

A further object of the invention is to provide a novel cabinet which is collapsible and which can be folded into a compact package for storage or transportation purposes.

A further object of the invention is to provide a novel cabinet of the above type constructed with an opening in one of its sides by which an image projected from a projection apparatus located outside of the cabinet will be reflected by the mirror onto the back of the screen. A further object of the invention is to provide a cabinet of this type in which the image projected on the screen is plainly and clearly visible in the daylight or in a location that is artificially lighted thus making it unnecessary to use a darkened room for viewing the pictures projected on the screen.

A still further object of the invention is to provide a novel screen so constructed that the image projected on the rear face thereof has or appears to have depth without distortion.

Still another object of the invention is to provide a portable combined cabinet and screen which is of great advantage to lecturers because its relatively small size and collapsibility enable it to be readily transported from place to place and erected in any desired location.

Further objects of the invention are to improve projection screens and cabinets therefor in the particulars hereinafter set forth.

In the drawings, wherein we have illustrated a selected embodiment of the invention, Fig. 1 is a perspective view of a combined cabinet and screen embodying the invention and having a portion of the covering removed to partly show the interior construction.

Fig. 2 is a fragmentary view illustrating the manner of pivoting the side frame members to the front and rear frame members.

Fig. 3 is a fragmentary view illustrating the pivotal joint between the sections of each side frame member.

Fig. 4 is a plan view of the frame of the cabinet with the covering removed.

Fig. 5 is a fragmentary sectional view showing the screen.

Fig. 6 is a plan view of the frame of the cabinet showing it partially folded.

Fig. 7 is a view with the parts broken out showing the frame completely folded.

Fig. 8 shows the frame folded and with the covering wrapped thereabout ready for storage or transportation.

Fig. 9 is a perspective view of the cabinet illustrating the hooded opening through which the picture is projected into the mirror.

Fig. 10 is a section on the line 10—10, Fig. 9.

Fig. 11 is a fragmentary view of one of the side frame members illustrating the folding struts for holding the hooded opening in expanded position.

In the drawings the cabinet is indicated generally at 1 and it is constructed with a front screen-carrying frame member 2, a rear mirror-carrying frame member 3 which has substantially the same size as the front screen-carrying frame member 2, and two side frame members 4 and 5. These frame members are skeleton structures and may conveniently be made of angle iron.

The front frame member 2 has the screen 6 mounted therein and the rear frame member 3 has a mirror 7 mounted thereon which faces the screen, the front or reflecting face of the mirror being in a plane parallel to the plane of the rear frame member. The screen is made of translucent material and preferably is a laminated member formed of a plurality of thin laminations of translucent plastic bonded together. The top and back of the cabinet is covered by a covering element 8 of a flexible substantially opaque material which extends from the top of the front frame member 2, to which it is secured, over the top of the frame and around the upper side of the rear frame member 3 and over the rear face thereof.

Each side frame member 4 and 5 is also provided with a covering of flexible substantially opaque material, the covering for the side frame member 4 being indicated at 9 and that for the side member 5 being indicated at 10.

The covering members 9 and 10 are permanently secured to the side frame members and are coextensive therewith.

Each side member 4 and 5 is an articulated member and is pivotally connected to both the front and rear frame members. The sections of each articulated side member are so joined together that each member can be folded inwardly to permit the entire cabinet to be folded into a compact package as will be presently described. The pivotal connection between each side member and the front and rear frame members is a permanent connection, so that the four frame members, i. e., the front and back frame members and the two side frame members, form a unitary structure.

The side frame member 4 is formed with the top rail 11 and a bottom rail 12. Each of these rails is formed in two sections pivotally connected together to permit the side section to be folded inwardly as shown in Fig. 6.

The two sections of the top rail are shown at 13 and 14, and these are pivotally connected together at 15. The section 14 is pivotally connected to the front frame section at 16 and the section 13 is pivotally connected to the rear frame section at 17. The two sections of the lower rail 12 are indicated at 18 and 19, said sections being pivotally connected together at 20 and the section 18 being pivoted to the front frame member 2 while the section 19 is pivoted to the rear frame member 3.

Each side frame member is also shown as having vertically extending posts 21 connecting the top and bottom rails and is also provided with brace elements 22 which help to stiffen the structure.

The covering element 9 for the side frame member 4 is provided with a hooded opening 23 through which a picture projected by a projection apparatus 24, the lens tube only of which is shown in the drawings, may be projected onto the mirror 7.

The side frame 4 is slightly longer than the side frame 5, so that when the cabinet frame is opened or expanded as shown in Fig. 4, and is in condition for use, the back frame member 3 and the mirror 7, which lies flatly thereagainst, will have an angular relation to both the screen 6 and the projection apparatus 24. This angular relation is such that the image which is projected onto the mirror will be reflected thereby onto the back of the screen and will be visible to persons viewing the front of the screen, as shown by dotted lines in Fig. 4. The covering element 9 for the side frame 4 is provided with the hood portion 30 which forms the forwardly directed opening 23 to receive the lens tube 24 of the projecting apparatus. This opening 23 is held expanded by two strut members 25 which are secured to the front post 21 and which are located inside of the hood 30 at the top and bottom of the opening 23. These struts 25 are pivotally connected to the post 21 as shown at 26 in Fig. 11 so that they can be folded into a position in which they lie flatly against said post 21.

The projection apparatus may be mounted on any suitable support alongside of the cabinet adjacent its front end and in a position to project the image through the forwardly facing opening 23 onto the mirror 7, said mirror, as stated above, reflecting the image onto the back face of the screen 6.

When the cabinet is to be folded for storage or transportation purposes, the cover element 8 which covers the top of the cabinet frame and also the back frame member 3, may be lifted free from the frame and the two articulated side frames 4 and 5 may be folded inwardly as shown in Figs. 6 and 7 thereby to bring the rear frame member 3 into a position immediately behind and closely adjacent and parallel to the front frame member 2 as seen in Fig. 7.

Since the side covering elements 9 and 10 are permanently secured to the side frame members 4 and 5, said side covering members will be folded into the folded side members. Inasmuch as the front and rear frame members 2 and 3 are of substantially the same size, the folded cabinet frame forms a very compact package as illustrated in Fig. 7.

Before these side members are thus folded, however, the struts 25 should be folded upwardly against the post 21 so that they will not interfere in any way with the folding of the side frame.

After the cabinet frame has been thus folded, the cover element 8 may be wrapped around the folded frame as shown in Fig. 8 thereby entirely enclosing the folded frame and protecting the screen 6. The cover element 8, which is separate from the cover elements 9 that cover the side frames, thus has a dual purpose. When the frame is expanded, it forms the cover for the top of the expanded frame and for the rear frame member 3, and when the frame is folded, it provides a cover which encloses the folded frame and also covers and protects the screen 6 as seen in Fig. 8.

The front frame member 2 may conveniently be provided with a handle 27 by which the folded cabinet and screen can be readily carried.

As stated above our improved screen is so constructed that the image projected on the back thereof has, when viewed from the front, a depth equal to the thickness of the screen.

This result is obtained by making the screen of a plurality of thin laminations (four laminations being illustrated in the drawing) of translucent plastic material bonded together.

The image which is projected on the back of the screen will be repeated on the back of each lamination, and in this way the image as viewed from the front of the screen will be an actual depth equal to the thickness of the screen.

Another advantage resulting from this construction is that because of the depth which the image has, the practical angle of vision within which the image can be satisfactorily viewed from in front of the screen is increased to approximately 180°.

Furthermore the laminations of the screen diffuse the light rays slightly so that the sense of depth resulting from the laminated structure is increased sufficiently to give the impression of a third dimension, which produces a particularly real and vivid image with color projection.

We claim:

A projection apparatus comprising a foldable frame rectangular in vertical cross section and presenting a front screen-carrying frame member, a rear mirror-carrying frame member, and two articulated inwardly folding side frame members forming the two opposed vertical sides of the frame, said front and rear frame members having substantially the same size and each side frame member being permanently and pivotally connected to both the front and rear frame members, a translucent screen carried by the front screen-carrying frame member, a mirror rigidly carried by the rear mirror-carrying frame member and having its reflecting face in a plane parallel to the plane of said rear frame member, a cover element of flexible substantially opaque material secured to the top of the front frame member and located exterior to the frame and of a length to extend from the top of the front frame member over the top of the frame when the latter is extended and to cover the rear frame member, and a separate cover element on the exterior of each side frame member, each separate cover element completely covering its side frame member and being permanently secured at its vertical edges to the front and rear frame members and at its top and bottom edges to the top and bottom of the corresponding side frame member, one of the side frame members being longer than the other and the cover element for said longer side frame member having a hooded opening through which a picture can be projected on to the mirror, said longer side frame member maintaining the rear frame member and the mirror carried thereby at the proper angle relative to the front screen-carrying frame member so that the image projected on to the mirror through said hooded opening will be reflected on to the back of the screen, said frame being foldable into a compact carrying package with the front and rear frame members closely adjacent each other by folding the two side members inwardly, said cover element for the top of the frame being of a length to wrap completely about and enclose the frame when the latter is folded.

JOSEPH BURLEIGH.
JOSEPH CASHMAN.

REFERENCES CITED

The following references are of record in the file of this patent:

UNITED STATES PATENTS

| Number | Name | Date |
|---|---|---|
| 1,460,600 | Palmer | July 3, 1923 |
| 1,533,374 | Brixey | Apr. 14, 1925 |
| 1,994,543 | Stenz et al. | Mar. 19, 1935 |
| 2,141,528 | Garrard et al. | Dec. 27, 1938 |
| 2,225,012 | Kallusch | Dec. 17, 1940 |
| 2,234,950 | Barclay | Mar. 18, 1941 |
| 2,396,251 | Colley | Mar. 12, 1946 |
| 2,441,159 | Lehman et al. | May 11, 1948 |